Figure 1:
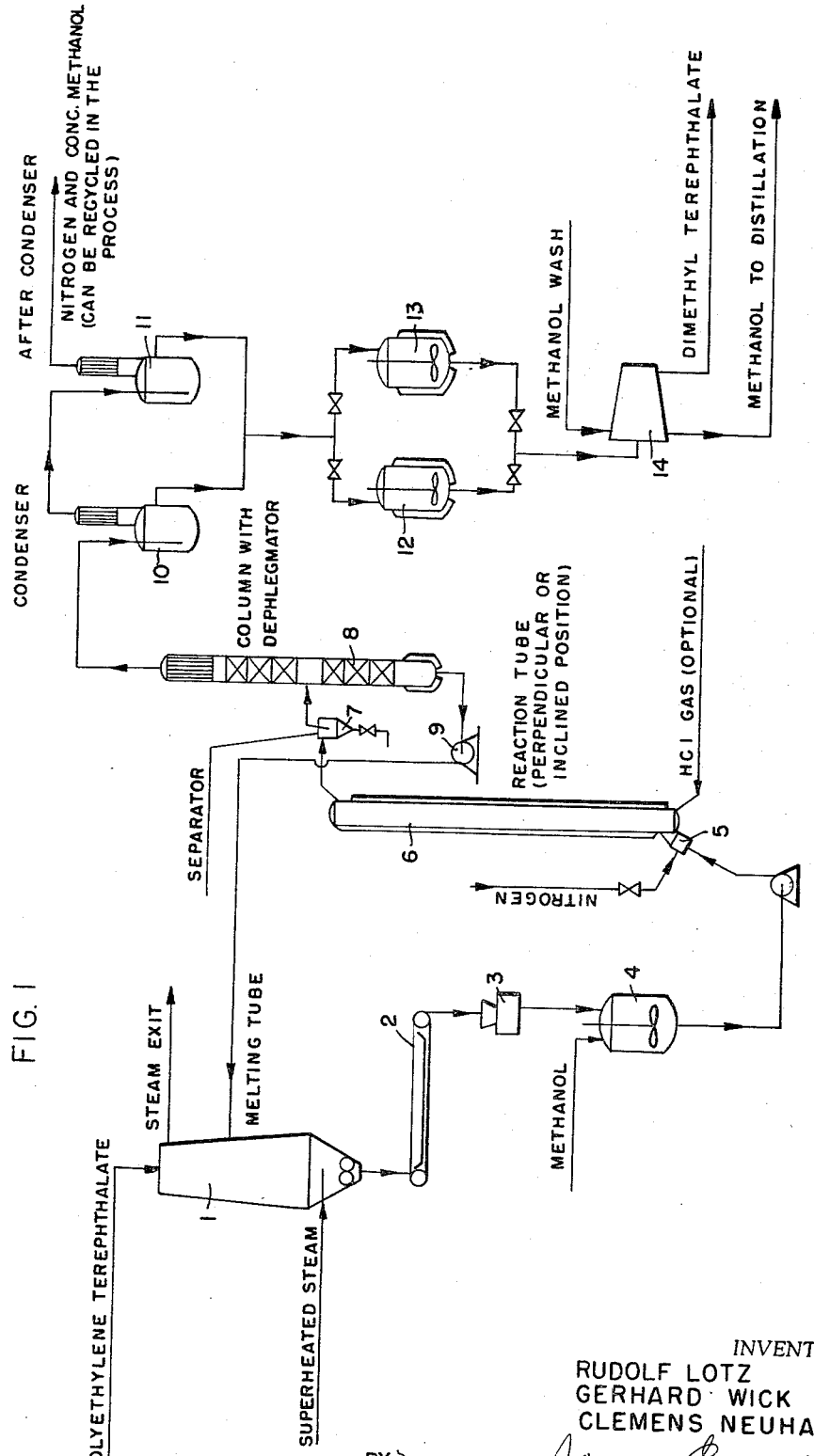

May 23, 1967

R. LOTZ ETAL 3,321,510

PROCESS FOR THE RECOVERY OF DIMETHYL TEREPHTHALATE
FROM POLYETHYLENE TEREPHTHALATE

Filed Aug. 7, 1963

2 Sheets-Sheet 1

FIG. I

INVENTORS:
RUDOLF LOTZ
GERHARD WICK
CLEMENS NEUHAUS

BY Marzall, Johnston, Cook & Root

ATT'YS

United States Patent Office 3,321,510
Patented May 23, 1967

3,321,510
PROCESS FOR THE RECOVERY OF DIMETHYL TEREPHTHALATE FROM POLYETHYLENE TEREPHTHALATE
Rudolf Lotz, Obernburg (Main), Gerhard Wick, Erlenbach am Main, and Clemens Neuhaus, Erlenbach, Germany, assignors to Vereinigte Glanzstoff-Fabriken Ag, Wuppertal-Elberfeld, Germany
Filed Aug. 7, 1963, Ser. No. 300,701
Claims priority, application Germany, Aug. 17, 1962, V 22,920
16 Claims. (Cl. 260—475)

This invention is concerned with a process for the pressureless recovery of regeneration of dimethyl terephthalate from polyethylene terephthalate. More specifically, the invention is directed to a highly improved and efficient method of decomposing polyethylene terephthalate into a pure dimethyl terephthalate under conditions which do not require elevated pressures or high-pressure apparatus, the process of the invention thereby being more readily adapted to continuous operation.

It is known that polyethylene terephthalate, in the form of waste or scrap material, can be decomposed or degraded into dimethyl terephthalate by reaction with methanol at high temperatures and under high pressures. The known reactions proceed with relatively good conversions and purity of the dimethyl terephthalate product. However, carrying out the reaction under high pressures is quite difficult and requires expensive apparatus. Even a slight leakage or loss of pressure in this apparatus requires an interruption of the decomposition reaction. It is necessary to shut down and restart the pressurized decomposition apparatus, and this procedure always entails substantial material losses of the polyester and methanol as well as a considerable reduction in the rate of throughput and in the quality of the final product.

An attempt has been made to decompose molten polyethylene terephthalate into dimethyl terephthalate without use of pressure by conducting methanol vapors over or through the molten material. In such known reactions, however, there is still much to be desired in terms of reaction speed and the yield of dimethyl terephthalate, and it is quite difficult to prevent excessive decomposition and the formation of undesirable impurities.

One object of the present invention is to provide an improved process for the regeneration of dimethyl terephthalate from polyethylene terephthalate whereby the use of special pressure conditions can be avoided while also achieving high rates of conversion in a more easily controlled process. Another object of the invention is to provide an improved method for the continuous regeneration of dimethyl terephthalate from polyethylene terephthalate for long periods of time without costly interruptions or impairment of quality of the final product.

Figure 2:
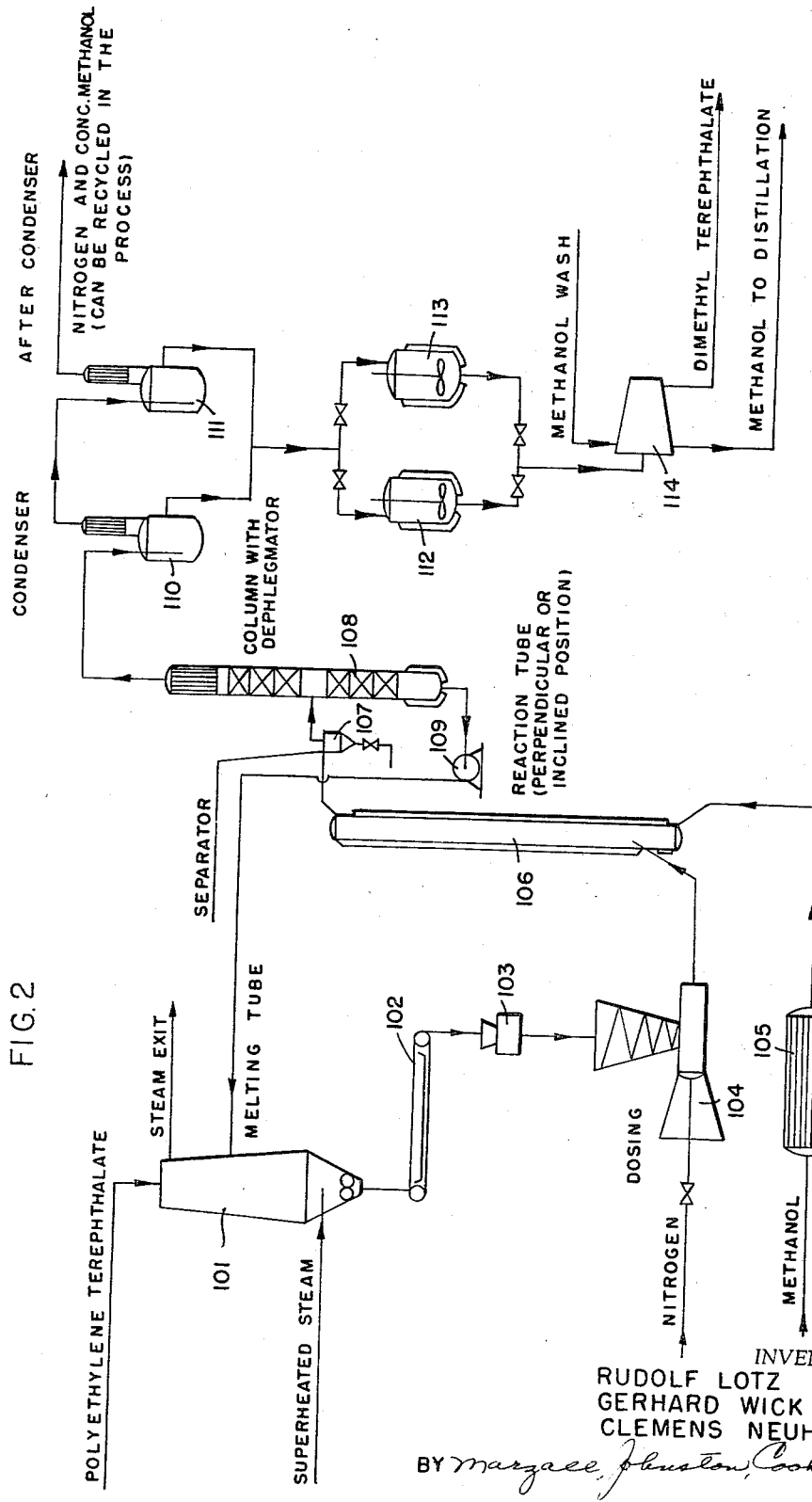

These and other objects and advantages of the invention will become more apparent from the following detailed description of the invention and the accompanying drawings wherein FIGS. 1 and 2 illustrate two different embodiments of the process of this invention in the form of schematic flow sheets.

It has now been found, in accordance with the present invention, that a highly improved process for the pressureless regeneration of dimethyl terephthalate from polyethylene terephthalate can be achieved by first treating the polyethylene terephthalate with steam at a temperature of about 200° C. to 450° C., and then reducing this steam-treated polyethylene terephthalate in the form of a brittle solid product to a powder having a mean particle size of about 0.0005 to 0.002 mm. Subsequently, this fine powder is atomized together with at least one gaseous substance selected from the group consisting of an inert gas and methanol vapor to form an aerosol, the aerosol being conducted in turbulent flow through a reaction zone maintained at a temperature of about 250° C. to 300° C. in the presence of excess methanol vapors. The desired dimethyl terephthalate is then separated from the effluent reaction product of the reaction zone. In particular, it is preferred to first cool the effluent reaction products to a temperature of about 165° C. to 175° C. with separation of the solid and liquid components at this temperature, and the remaining components are further cooled to form a liquid which can be subjected to fractional crystallization for the recovery of dimethyl terephthalate. It is especially desirable to carry out the process of this invention in a continuous manner, as described more fully hereinbelow, so that unreacted solid and condensed liquid components separated at about 165–175° C. can be continuously recycled to the reaction zone after first reducing the solids to a mean particle size of approximately 0.001 mm.

The process of this invention is referred to as a "pressureless" regeneration of dimethyl terephthalate because when one observes the critical conditions of this invention, the process is normally carried out at approximately atmospheric pressure. Thus, the process of the invention is carried out without the necessity of employing special pressurizing apparatus, thereby avoiding the difficulties in prior high-pressure processes while still obtaining high yields of pure dimethyl terephthalate over long periods of time.

The term "aerosol" is employed herein with the usual meaning of a finely divided solid, usually colloidal in size, being suspended in a gaseous medium. The aerosol in this invention is formed by atomizing the finely divided polyethylene terephthalate through a suitable atomizer or spray nozzle, either by entrainment in the gaseous substance or by first suspending the solid particles in liquid methanol and then atomizing both the liquid and suspended solid into an aerosol. In all cases, it is essential for the purposes of the present invention that the polyethylene terephthalate powder be made up of substantially colloidal particles, i.e. a mean particle size of approximately 0.001 mm. In no instance should the mean particle size exceed 0.002 mm.

The process of the invention is especially useful in the treatment of polyethylene terephthalate as a polyester waste product in the form of badly dyed or otherwise spoiled waste materials, including filaments, fibers, tapes, films, fabrics and the like. The crude polyester may also contain a variety of contaminants such as finishing agents, pigments or the like. The crude polyester may also be a waste material because of its poor chemical or physical properties which render it unsatisfactory for commercial use. By using the process of this invention, the crude polyester can be more easily decomposed into a pure dimethyl terephthalate suitable for repolymerization into a commercially useful polyester.

In carrying out the process of the invention, it is first necessary to contact the polyethylene terephthalate with superheated steam at a temperature of about 200° C. to 450° C., preferably by first preheating the steam to a temperature of about 350° C. to 420° C. and then conducting the steam in countercurrent flow in a suitable heating zone for contact with the polyethylene terephthalate. With this steam treatment, it is possible to heat the polyethylene terephthalate above its melting point and then extrude or cast the molten polyester into the form of a relatively thin band or film. After cooling to solidify the polyester, it is rapidly converted into a very brittle product which can be reduced or mechanically broken up in conventional grinding mills into colloidal particles with a mean particle size of approximately 0.001 mm. In general, the mixture of particles obtained by this grinding step consists predominately of colloidal particles and even the largest particles do not exceed a diameter of about 0.005 mm.

In order to react the resulting polyethylene terephthalate powder with methanol in a heated reaction zone, it is necessary to introduce the powder into the reaction zone in the form of an aerosol. This aerosol can be produced by a number of methods with the aid of flowing inert gases or flowing methanol vapors or a mixture of both inert gases and methanol vapors. In all cases, the gaseous substance employed as the suspending medium of the aerosol must be maintained under conditions of turbulent flow in the reaction zone.

According to one preferred method of the invention, the inert gas or methanol vapor or a mixture thereof is first accelerated into turbulent flow before being brought into contact with the polyethylene terephthalate powder. This can be easily accomplished by means of a conventional blower capable of producing a turbulent stream of the gaseous substance, the polyethylene terephthalate powder then being introduced into this turbulent stream and the resulting suspension or aerosol then being passed through the heated reaction zone. This particular method is indicated in FIG. 2 of the drawing by the blower 104 equipped with means for metering or dosing the powder into a turbulent stream of nitrogen.

The aerosol containing the polyethylene terephthalate powder can also be produced by first suspending the powder in liquid methanol. The resulting suspension is quite stable and can be easily introduced into the reaction zone as an aerosol by means of conventional spray nozzles or atomizers, such nozzles being adjustable or regulatable with respect to the rate of flow and also the size of the drops being sprayed. The liquid suspension is sprayed directly into flowing inert gases or flowing methanol vapors or a combination of both. According to the preferred execution of this method, the inert gases and/or methanol vapors are in a state of turbulent flow and the suspension is sprayed into this turbulent stream. Thus, the gaseous substance may be introduced for turbulent flow into the reaction zone, and the suspension then sprayed into the reaction zone so that the aerosol is entrained by the flowing gases. The inert gases and/or methanol vapors may also be preheated to the reaction temperature of about 250–300° C. before their introduction into the reaction zone.

Upon introduction of the aerosol into the reaction zone, the polyethylene terephthalate powder reacts with the excess methanol to form dimethyl terephthalate while splitting off ethylene glycol. According to known reaction laws, there should preferably be an excess of methanol amounting to at least 2.5 up to about five times the amount of polyethylene terephthalate used in the reaction. In general, larger amounts of methanol are feasible but uneconomical. The turbulently flowing aerosol is brought to a temperature of 250° C. to 300° C. in the reaction zone which may be formed by any suitable elongated tubular or cylindrical apparatus. It is essential that the reaction be carried out in this reaction zone without the use of pressure, i.e. at substantially atmospheric pressure. It was found that under these conditions the conversion of the polyethylene terephthalate into dimethyl terephthalate takes place at an extremely high reaction speed even at atmospheric pressure. Furthermore, side reactions are practically negligible so that there is no interference with a continuous operation. Of course, it is necessary to carry out this reaction in an oxygen-free atmosphere, so that in starting up the process air must be first displaced from the reaction zone and access of oxygen into the reaction zone must be prevented. This exclusion of oxygen is obviously much easier when the reaction is carried out under approximately atmospheric pressure as compared to processes requiring high pressure.

In carrying out the reaction between the polyethylene terephthalate and methanol, it is especially preferred to introduce the aerosol and/or the supplemental gaseous substances tangentially into the tubular reaction chamber for spiral flow through the reaction zone. In this manner, the aerosol is not only conducted in turbulent flow but also in a circular or spiral direction of flow through the reaction zone. If desired, this circular or spiral movement of the gases can be enhanced by mechanical aids, for example, by using rapidly rotating agitating devices such as turbines or impeller mixers into the reaction zone. Baffles or rebound plates may also be arranged within the reaction zone to facilitate a rapid and uniform mixing of the aerosol.

The aerosol in gaseous or sprayed liquid form as well as any supplementary gaseous materials are preferably introduced into the lower or bottom end of the tubular reaction chamber which should be arranged in a vertical or at least an inclined position. As the reactants are introduced at the bottom of the reaction tube, the resulting aerosol is forced upwardly with a circular turbulent movement, and the reaction products are withdrawn from the top portion of the reaction tube or column. The throughput of the gaseous suspension can be easily regulated by adjusting one or more of the gaseous streams being introduced into the reaction zone. The residence time of the reactant materials in the reaction zone can be adjusted by changing the height of the reaction column or by increasing the speed of flow of the inert gas such as nitrogen, a separate introduction of a nitrogen stream being preferred in the latter case.

The effluent products from the reaction zone consist essentially of dimethyl terephthalate, ethylene glycol, unreacted methanol and unreacted polyethylene terephthalate or partially decomposed lower molecular weight polymers thereof. In addition, the effluent reaction gases contain relatively small amounts of entrained solids and liquid particles in mist or vaporous form as impurities, for example, catalysts or pigments introduced with the initial polyester reactant and low molecular weight ethylene terephthalate oligomers, all of which must be separated from the desired dimethyl terephthalate product. It is advantageous to first conduct the effluent reaction gases through centrifugal separators such as cyclones in order to remove the bulk of solid components and those products present in the form of a mist. Before completely condensing the gaseous components of the reaction, it is also advisable to carry out an intermediate cooling step in which the effluent reaction products are cooled to a temperature between about 165° C. and 175° C. in order to substantially recover at this stage not only unconverted polyethylene terephthalate but also the lower molecular weight oligomers of ethylene terephthalate contained in the reaction products. This intermediate separation is most conveniently carried out by the use of a conventional separating column, such as a fractionating column maintained at the intermediate cooling temperature.

The remaining gaseous reaction products separated and withdrawn from the top of the intermediate cooling column are then further cooled, so as to condense the remaining components consisting essentially of dimethyl terephthalate, ethylene glycol and methanol. This cooling can also be carried out in fractional steps with excess methanol being recovered in gaseous form together with any inert gas such as nitrogen, such inert gas of course remaining gaseous throughout the reaction and separating steps. The liquid condensate is then subjected to fractional crystallization in which a very pure dimethyl terephthalate is crystallized out in high yields and can be easily isolated. The dimethyl terephthalate crystals, after being separated from the mother liquor, are preferably washed with cold methanol and then dried in conventional manner.

The incompletely reacted polyethylene terephthalate components which are separated while working up the dimethyl terephthalate product can be cooled, repulverized into colloidal particles and then returned to the reaction zone as an aerosol. Likewise, any methanol remaining in the mother liquor after fractional crystallization can be recovered by distillation and also recycled to the reaction zone. The inert gases together with excess methanol can also be recycled to the reaction zone, provided that care is taken during the fractional cooling of the gaseous reaction products such that they are not permitted to be mixed with atmospheric oxygen.

The decomposition of polyethylene terephthalate into dimethyl terephthalate according to the process of the invention can be accomplished without the addition of a catalyst. However, in many cases the presence of a catalyst is helpful, and it is especially advantageous to introduce the gaseous catalyst, such as hydrogen chloride gas, into the reaction zone. In those instances where it is desirable to decompose a polyester textile waste material which contains compounds derived from tribasic acids, especially phosphoric acid, it is recommended that the reaction between the polyester and excess methanol be carried out in the presence of zinc oxide or zinc salts of organic and inorganic acids, e.g. zinc nitrate, zinc carbonate, zinc chromate, zinc halides including zinc fluoride and zinc salicylate. These zinc compounds are preferably added to the polyethylene terephthalate before the grinding step; otherwise the solid catalyst should be separately ground or reduced to a particle size corresponding to the polyester powder. All of these catalysts have previously been described by us or others for use in the regeneration of dimethyl terephthalate from the crude or waste polyester, but the above-noted catalysts are especially useful when used in combination with the specific procedure of the present invention.

The invention is further illustrated by but not restricted to the following examples in which two different embodiments of the process are set forth with reference to the accompanying drawings. The apparatus in Example 1 is shown in the flow sheet of FIG. 1, and the apparatus in Example 2 is shown by the flow sheet of FIG. 2. The entire process as illustrated by the examples and drawings does not require any special pressurized apparatus, i.e. each step is carried out under approximately atmospheric pressure.

*Example 1*

1000 g. of polyethylene terephthalate in the form of waste textile scraps are treated in a vertical tube 1 with counterflowing superheated steam preheated to a temperature of about 400° C. The steam gives off a part of its heat capacity to the polyethylene terephthalate and leaves the tube with a temperature of about 200° C. The oily textile auxiliary or finishing agents adhering to the polyethylene terephthalate scraps distill off with the steam. The polyethylene terephthalate is heated by the steam to above its melting point and collects as a melt at the bottom of the tube 1. This melt is maintained at approximately 280° C. and is continually poured onto an endless steel band or belt 2 and solidified by cooling into a thin film. Through this steam treatment the polyethylene terephthalate has become so brittle that with the aid of a conventional mill 3 it can be ground to a powder having a mean particle size of 0.001 mm. This powder is then suspended in 4 liters of methanol in a mixing tank 4. The stable liquid suspension is sprayed or atomized to form an aerosol with the aid of a Nubliosa spray nozzle 5 (a conventional regulatable atomizer). At the same time, 0.1% by weight (with reference to the polyethylene terephthalate used) of dry hydrogen chloride gas is also introduced at the bottom of the reaction tube 6. The atomizer 5 is operated by passing nitrogen therethrough to produce turbulent flow. The nitrogen flows at a speed of 15 cm./sec. and the Reynolds number was determined as 2,630.

The turbulently flowing aerosol of polyethylene terephthalate suspended in methanol vapor and nitrogen is tangentially introduced at the lower end of the reaction tube 6 which is 3 m. in length and 50 cm. in diameter. The reaction tube is indirectly heated by a jacket heater, and the turbulent reaction mixture is raised to a temperature of 270° C. The reactants circulate or flow spirally upwardly in the reaction tube 6 and then emerge tangentially at the upper end of the tube and pass through a cyclone separator 7 and if desired into a tank which is maintained at 250° C. A column 8 equipped with a dephlegmator is placed on the tank or else the reaction products are led directly into the column 8 at 250° C. so as to bring about a further cooling of the reaction products. The fractionating column 8 is controlled in such a way that only those reaction products go over which still remain vaporous at a temperature of 165° to 175° C. The solid or condensed liquid products are separated off and are cooled, repulverized and used again as indicated by the recycle pump 9. The reaction products remaining in vapor or gaseous form are cooled to 65° C. with the aid of a second cooling unit consisting of condenser 10 and aftercondenser 11. There results a liquid glycol-methanol mixture which is further cooled in crystallizers 12 and 13. After relatively slow crystallizing out, very pure dimethyl terephthalate is obtained by centrifuging and washing the crystalline product 14 with methanol. There are obtained 920 g. of dimethyl terephthalate which can be directly polycondensed by known methods into polyethylene terephthalate. This recondensed ployester is a linear polymer which can be spun by the melt-spinning process into filaments or fibers of high quality.

*Example 2*

1000 g. of polyethylene terephthalate scraps are treated as in Example 1 with superheated steam in tube 101 and the molten polyester solidified on continuous belt 102. The solid polyester is then mechanically ground with the aid of a micro-cyclone mill 103 into particles of a mean size of 0.001 mm. This powder is then dosed into a blower 104 where it is entrained by a turbulent stream of flowing nitrogen. The nitrogen emerges from three nozzle openings in the blower and flows at a speed of 17 cm./sec. The aerosol formed by passing nitrogen through the polyethylene terephthalate powder is conducted into the bottom end of a cylindrical, vertically-positioned reaction tube 106 having a length of 3 m. and a diameter of 50 cm.

4000 cc. of methanol are evaporated in heat exchanger 105 and brought to a temperature of 300° C. The methanol vapor is introduced below the feed of the polyethylene terephthalate aerosol into the reaction tube 106. The two feed streams are introduced tangentially, and as a result the reactants execute a circulatory or spiral movement in the reaction tube and, displaced by newly supplied reactants, also flow upwardly under turbulent flow conditions to the top of tube 106. The effluent reaction products are conducted to a separator 107 maintained at 250° C., wherein entrained solid and mist-form or liquid particles, such as incompletely reacted polyethylene terephthalate, catalysts and matting agents such as titanium dioxide are separated. The remaining gaseous reaction products are fed into a fractionating column 108 in which they are cooled to 170° C. At this point, oligomeric ethylene terephthalates are condensed and separated from the bottom of column 108. The distillate from column 108 is then cooled to 65° C. in the condensers 110 and 111. A fractional crystallization is finally carried out in crystallizers 112 and 113 with separation of a highly pure dimethyl terephthalate in crystalline form in centrifuge 114, substantially as described in Example 1. Again, high yields of dimethyl terephthalate are obtained which can be recondensed into an excellent fiber-forming polyester.

The process of the invention is very economical to operate and it is possible to obtain an almost complete conversion of the polyethylene terephthalate into dimethyl terephthalate, especially if the process is executed in a continuous manner with practically complete recycle of unreacted or partly decomposed polyester. Surprisingly, the amount of undesirable by-products is so low that even with a closed recycle system, the continuous process can be carried out for extended periods of time without loss in yields or purity of the dimethyl ester product. The invention therefore provides a highly advantageous "pressureless" process for the regeneration of dimethyl terephthalate.

The invention is hereby claimed as follows:

1. A process for the regeneration of dimethyl terephthalate from polyethylene terephthalate which comprises: temelting polyethylene terephthalate with steam at a temperature of about 200° C. to 450° C.; cooling the molten polyethylene terephthalate to the solid state and reducing the resulting brittle polyethylene terephthalate product to a powder having a mean particle size of about 0.0005 to 0.002 mm.; atomizing said powder together with at least one gaseous substance selected from the group consisting of an inert gas and methanol vapor to form an aerosol; conducting said aerosol in turbulent flow through a reaction zone maintained under approximately atmospheric pressure at a temperature of about 250° C. to 300° C. in the presence of excess methanol vapors; and separating dimethyl terephthalate from the effluent reaction products.

2. A process as claimed in claim 1 wherein said aerosol is prepared by conducting said gaseous substance through said polyethylene terephthalate powder for entrainment and atomization of the finely divided solid particles.

3. A process as claimed in claim 1 wherein said polyethylene terephthalate powder is first suspended in liquid methanol and the liquid suspension is then atomized and sprayed into said reaction zone together with said gaseous substance.

4. A process as claimed in claim 1 wherein a turbulently flowing gaseous substance is employed for atomizing said powder and producing an aerosol therefrom.

5. A process as claimed in claim 1 wherein at least one of said gaseous substances is preheated to a temperature of about 250° C. to 300° C. prior to the production of the aerosol.

6. A process as claimed in claim 1 wherein said powder has a mean particle size of approximately 0.001 mm.

7. A process as claimed in claim 1 wherein the aerosol flows spirally through said reaction zone.

8. A process as claimed in claim 1 wherein the effluent reaction products from said reaction zone are first cooled to a temperature of about 165° C. to 175° C. for separation of solid and liquid components, and the remaining components are then liquefied by further cooling and subjected to fractional crystallization for recovery of dimethyl terephthalate.

9. A process as claimed in claim 1 wherein said polyethylene terephthalate is reacted with said methanol in the presence of gaseous hydrogen chloride as a catalyst.

10. A process as claimed in claim 1 wherein said polyethylene terephthalate is reacted with said methanol in the presence of a catalytic compound selected from the group consisting of zinc oxide and zinc salts.

11. A continuous process for the regeneration of dimethyl terephthalate from polyethylene terephthalate which comprises: continuously introducing a polyethylene terephthalate waste material into a heating zone for contact with superheated steam at a temperature of about 200° C. to 450° C.; continuously removing molten polyethylene terephthalate from said heating zone, cooling said molten polyethylene terephthalate to the solid state and reducing the solid polyethylene terephthalate to powder having a mean particle size of about 0.0005 to 0.002 mm.; continuously introducing said powder into an elongated reaction zone for spiral turbulent flow therethrough in the form of an aerosol obtained by atomizing said powder together with at least one gaseous substance selected from the group consisting of an inert gas and methanol vapor; reacting said polyethylene terephthalate in said reaction zone with excess methanol under approximately atmospheric pressure and at a temperature of about 250° C. to 300° C.; continuously leading the effluent reaction products from said reaction zone into an intermediate cooling zone maintained at a temperature of about 165° C. to 175° C. with separation of the solid and condensed liquid components; and liquefying and cooling the remaining gaseous components from said intermediate cooling zone for fractional crystallization of dimethyl terephthalate therefrom.

12. A continuous process as claimed in claim 11 wherein said polyethylene terephthalate is contacted in countercurrent flow with said steam in said heating zone.

13. A continuous process as claimed in claim 11 wherein the steam-treated solid polyethylene terephthalate is reduced to a mean particle size of approximately 0.001 mm.

14. A continuous process as claimed in claim 11 wherein said polyethylene terephthalate is reacted with said excess methanol in the presence of gaseous hydrogen chloride as a catalyst.

15. A continuous process as claimed in claim 11 wherein said polyethylene terephthalate is reacted with said excess methanol in the presence of a catalytic compound selected from the group consisting of zinc oxide and zinc salts.

16. A continuous process as claimed in claim 11 wherein the separated solid and condensed liquid components separated from said intermediate cooling zone are continuously recycled to said reaction zone after first reducing the solids to a mean particle size of approximately 0.001 mm.

References Cited by the Examiner

UNITED STATES PATENTS 3,037,050 5/1962 Heisenberg et al. ---- 260—475
3,148,208 9/1964 Siggel et al. --------- 260—475

FOREIGN PATENTS 1,131,202 6/1962 Germany.

LORRAINE A. WEINBERGER, *Primary Examiner.*

RICHARD K. JACKSON, *Examiner.*

THOMAS L. GALLOWAY, Jr., *Assistant Examiner.*